US 9,949,196 B2

(12) United States Patent
Sahu et al.

(10) Patent No.: US 9,949,196 B2
(45) Date of Patent: Apr. 17, 2018

(54) SYSTEMS AND METHODS FOR EFFICIENT HANDLING OF LTE CELLS FOR SUSPENDING DATA IN A MULTIPLE SIM OR RADIO ACCESS TECHNOLOGY (RAT) SCENARIO

(71) Applicant: QUALCOMM Incorporated, San Diego, CA (US)

(72) Inventors: Debesh Kumar Sahu, Hyderabad (IN); Sagar, Hyderabad (IN); Tushar Gupta, Hyderabad (IN); Venkata Girish Vadlamudi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/085,232

(22) Filed: Mar. 30, 2016

(65) Prior Publication Data
US 2017/0289889 A1 Oct. 5, 2017

(51) Int. Cl.
*H04W 36/22* (2009.01)
*H04W 24/10* (2009.01)
(Continued)

(52) U.S. Cl.
CPC .......... *H04W 36/22* (2013.01); *H04L 5/0098* (2013.01); *H04L 43/0888* (2013.01);
(Continued)

(58) Field of Classification Search
CPC ..... H04W 36/22; H04W 24/10; H04W 36/04; H04W 36/30; H04W 36/38;
(Continued)

(56) References Cited

U.S. PATENT DOCUMENTS

2013/0194947 A1* 8/2013 Ehsan .................. H04L 5/0098
370/252
2013/0303168 A1* 11/2013 Aminzadeh
Gohari ............. H04W 36/0083
455/436
(Continued)

FOREIGN PATENT DOCUMENTS

WO 2012136592 A1 10/2012
WO 2012137034 A1 10/2012
(Continued)

OTHER PUBLICATIONS

International Search Report and Written Opinion—PCT/US2017/022818—ISA/EPO—Jun. 8, 2017.
(Continued)

*Primary Examiner* — George Eng
*Assistant Examiner* — Jing Gao
(74) *Attorney, Agent, or Firm* — Paradice and Li LLP

(57) ABSTRACT

A method, device, and system provide efficient way for handling LTE cells for suspending data suspending data in a carrier aggregation plus multiSIM scenario. The technique includes receiving communications corresponding to the first subscription at a user equipment over a primary cell and a secondary cell; calculating, prior to a tune away period, a first data throughput rate of the primary cell and a second data throughput rate of a secondary cell; sending at least one event measurement report if the second data throughput rate is higher than the first data throughput rate; receiving a handover command from a network node to interchange the primary cell and the secondary cell; and switching, in response to receiving the handover command, the primary cell and the secondary cell such that the primary cell becomes the secondary cell and the secondary cell becomes the primary cell for first subscription traffic.

16 Claims, 11 Drawing Sheets

(51) Int. Cl.
  *H04W 36/04* (2009.01)
  *H04W 36/30* (2009.01)
  *H04L 12/26* (2006.01)
  *H04L 5/00* (2006.01)
  *H04W 36/38* (2009.01)
  *H04W 68/00* (2009.01)

(52) U.S. Cl.
  CPC ........... *H04W 24/10* (2013.01); *H04W 36/04* (2013.01); *H04W 36/30* (2013.01); *H04W 36/38* (2013.01); *H04W 68/005* (2013.01)

(58) Field of Classification Search
  CPC .. H04W 68/006; H04L 43/0888; H04L 5/001; H04L 5/0098; H04L 5/006; H04L 5/0053; H04L 5/0023; H04L 5/0035; H04L 5/0048; H04L 1/0026

See application file for complete search history.

(56) References Cited

U.S. PATENT DOCUMENTS

| | | |
|---|---|---|
| 2013/0303181 A1 | 11/2013 | Rajurkar et al. |
| 2013/0337861 A1 | 12/2013 | Bhogaraju et al. |
| 2015/0230206 A1 | 8/2015 | Tabet et al. |
| 2015/0245358 A1* | 8/2015 | Schmidt ............ H04L 43/0888 370/329 |
| 2017/0041939 A1* | 2/2017 | Madan ................ H04W 72/082 |

FOREIGN PATENT DOCUMENTS

| | | |
|---|---|---|
| WO | 2014070066 A1 | 5/2014 |
| WO | 2014104961 A2 | 7/2014 |

OTHER PUBLICATIONS

Lee Y., et al., "A Combined Handover Scheme for LTE-Advanced System", IEEE 14th International Conference on Advanced Communication Technology (ICACT), Feb. 19, 2012, XP032153087, pp. 154-157.

* cited by examiner

SYSTEMS AND METHODS FOR EFFICIENT HANDLING OF LTE CELLS FOR SUSPENDING DATA IN A MULTIPLE SIM OR RADIO ACCESS TECHNOLOGY (RAT) SCENARIO

BACKGROUND

Aspects of the present disclosure relate generally to wireless communication systems, and more particularly, to tune away in wireless communication devices such as devices using one or more subscriber identity module (SIM) cards.

A wireless communication device, such as a mobile phone device or a smart phone, may include at least one Subscriber Identity Module (SIM). Each SIM may enable one or more subscriptions. Each subscription may correspond to one or more Radio Access Technologies (RATs). Specifically, with respect to multi-SIM wireless communication devices, when all SIMs are active, the wireless communication device may be a Multi-SIM-Multi-Active (MSMA) device. On the other hand, when one SIM is active while the rest of the SIM(s) is/are standing by, the wireless communication device may be a Multi-SIM-Multi-Standby (MSMS) device. With Dual Sim, Dual Standby (DSDS) or Multi-SIM-Multi-Standby (MSMS) devices only one SIM is active because there is one radio frequency (RF) chain which is shared by the SIMs. The RATs may include, but are not limited to, Frequency Division Multiple Access (FDMA), Time Division Multiple Access (TDMA), Global System for Mobile Communications (GSM), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), Single Radio LTE (SRLTE), Simultaneous GSM and LTE (SGLTE), High-Speed Downlink Packet Access (HSDPA), and the like), Code Division Multiple Access 1× Radio Transmission Technology (1×), General Packet Radio Service (GPRS), Wi-Fi, Personal Communications Service (PCS), and other protocols that may be used in a wireless communications network or a data communications network.

Some wireless devices are configured to facilitate communication on two separate networks via two separate subscriptions. For instance, dual-subscriber identity module (SIM), dual standby (DSDS) devices may include two SIM cards—one card for a first subscription and a second card for a second subscription. Furthermore, each subscription may be associated with one or more technology types. For example, a first subscription may exclusively support 2G communication technology, such as Global System for Mobile Communications (GSM), while the second subscription may support one or more 3G communication technologies (e.g., Wideband Code Division Multiple Access (WCDMA)) and 2G communication technology.

In DSDS devices, a user may establish a call, such as a voice call, data call, data session, text messaging session, or any other data transfer session, via one of the two subscriptions. Because most DSDS devices contain a single radio resource, such as a transceiver, where a first subscription has established an ongoing call with a first subscription network, the UE tunes the transceiver away to the second subscription to receive paging signals and to transmit, for example, message acknowledgement signals and/or measurement indication signals. Therefore, while the first subscription continues an ongoing call, the transceiver may periodically tune away from the first subscription to the second subscription to receive such paging and/or control information.

Therefore, in DSDS devices, a user may engage in a data call via a first subscription, but may intermittently halt the data session to tune away to receive control data associated with the second subscription, which is typically in idle mode. This tune away may lead to reduction in data throughput on the first subscription for its ongoing data call, as no data transfer takes place relative to the data call while the device tunes away to the second subscription which is then using radio resources such as the transceiver. What is more, the second subscription may hold the radio resources for a long period of time in order to complete software processing related to base station registration, which exacerbates the reduced data throughput problem on the first subscription. Tune away cannot be avoided completely, however, as the second subscription periodically receives control data from its network, such as paging messages and the like.

A DSDS device may also support carrier aggregation (CA), which is simultaneous operation on multiple carriers. Multi-mode transceivers including Long Term Evolution (LTE)/Frequency Division Duplex (FDD), LTE/Time Division Duplex (TDD), Circuit-Switched FallBack (CSFB), Simultaneous Voice and LTE (SVLTE), Simultaneous GSM and LTE (SGLTE), Dual SIM Dual Standby (DSDS), and other similarly-configured devices can co-exist in several different combinations.

Thus, methods and apparatuses are used to allow for increased performance on the first technology as it continues an active data session while allowing the second subscription to tune away to receive messages.

SUMMARY

Aspects of the present disclosure generally provide methods and apparatuses for improved throughput for network subscriptions in DSDS wireless devices or devices with multiple RATs by handling tuning away using primary and secondary cells (PCELL and SCELL) in a carrier aggregation scenario in a more efficient way. For example, before a UE attempts to use a second SIM and tune away in a DSDS and carrier aggregation scenario, the system will evaluate and compare the PCELL and SCELL throughput performance. If the SCELL performance is better than the PCELL performance, the UE can use a handover command from a network node to interchange the PCELL and SCELL functionality such that the PCELL is used to tune away to the second SIM, while the higher throughput SCELL is maintained for downlink data. Stated in another way, if the SCELL has higher throughput, it is switched to the function as the PCELL. The monitoring of the PCELL and the SCELL for which one has higher throughput can be done continuously or periodically such that the lower throughput cell is used for tuning away, thereby increasing overall throughput for traffic associated with the first SIM. This continuous or periodic evaluation/monitoring is helpful because either the PCELL or the SCELL could have higher throughput at different times based on various factors.

In a further aspect, the present disclosure provides for a method of managing a wireless communication device having a first subscription and a second subscription. The method includes receiving communications corresponding to the first subscription at a user equipment over a primary cell and a secondary cell; calculating, prior to a tune away period, a first data throughput rate of the primary cell and a second data throughput rate of a secondary cell; sending at least one event measurement report if the second data throughput rate is higher than the first data throughput rate; receiving a handover command from a network node to interchange the primary cell and the secondary cell; and switching, in response to receiving the handover command, the primary cell and the secondary cell such that the primary cell becomes the secondary cell and the secondary cell becomes the primary cell for first subscription traffic.

Furthermore, the present disclosure provides for a wireless device including at least one radio frequency (RF) resource and a processor coupled to the at least one RF resource, configured to connect to a first Subscriber Identity Module (SIM) associated with a first subscription and to a second SIM associated with a second subscription. The processor is configured to receive communications corresponding to the first subscription at a user equipment over a primary cell and a secondary cell; calculate, prior to a tune away period, a first data throughput rate of the primary cell and a second data throughput rate of a secondary cell; send at least one event measurement report if the second data throughput rate is higher than the first data throughput rate; receive a handover command from a network node to interchange the primary cell and the secondary cell; and switch, in response to receiving the handover command, the primary cell and the secondary cell such that the primary cell becomes the secondary cell and the secondary cell becomes the primary cell for first subscription traffic.

In addition, the present disclosure provides for a method of managing a wireless communication device having a first subscription supporting more than one radio access technology (RAT) active simultaneously. The method includes receiving communications corresponding to a first RAT of the first subscription at a user equipment over a primary cell and a secondary cell; calculating, prior to a tune away period, a first data throughput rate of the primary cell and a second data throughput rate of a secondary cell; sending at least one event measurement report if the second data throughput rate is higher than the first data throughput rate; receiving a handover command from a network node to interchange the primary cell and the secondary cell; and switching, in response to receiving the handover command, the primary cell and the secondary cell such that the primary cell becomes the secondary cell and the secondary cell becomes the primary cell for first RAT traffic.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
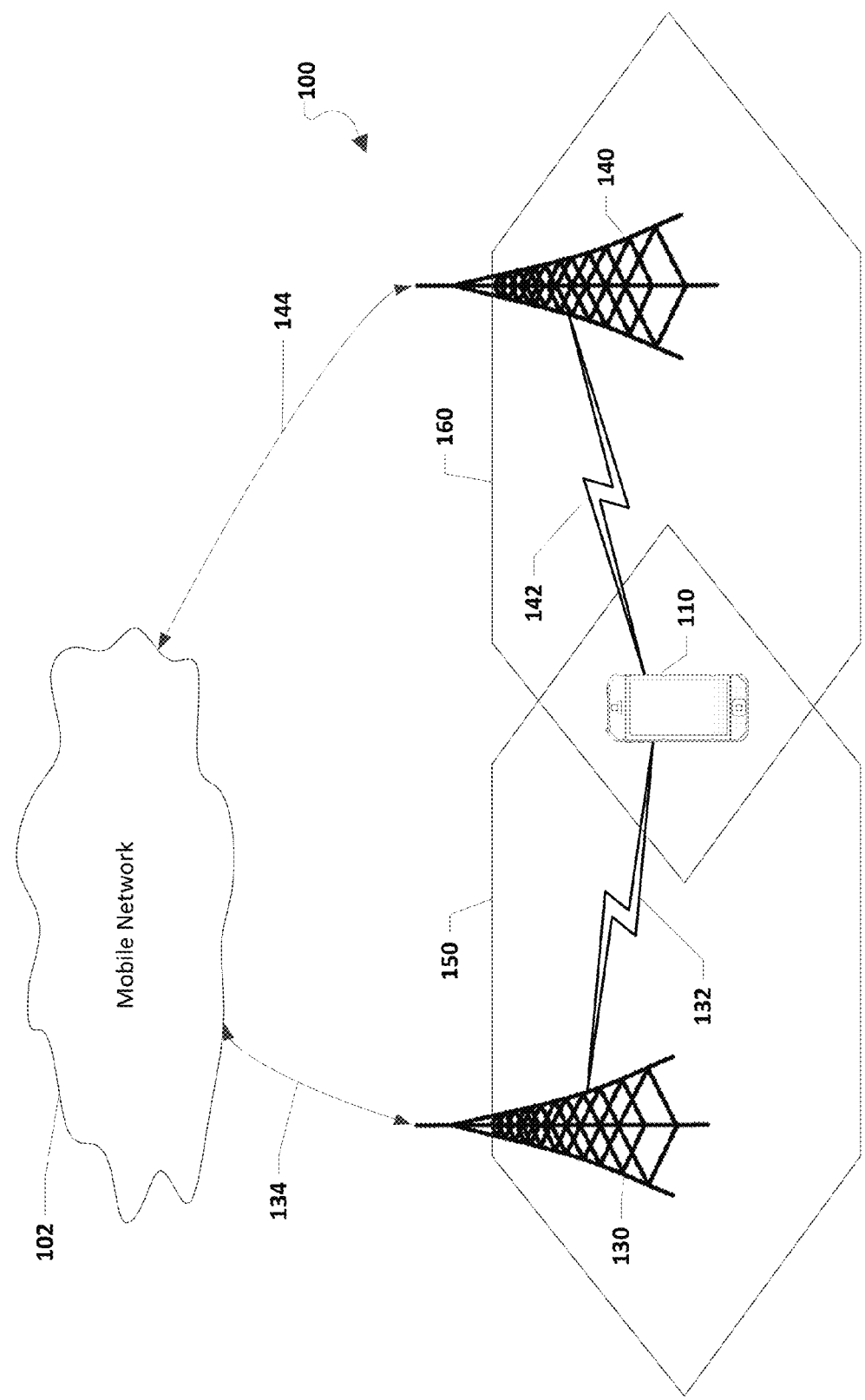
FIG. 1 is a schematic diagram illustrating an example of a communication system in which tuning away can be implemented in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

The present disclosure presents methods and apparatuses for improved tune away in user equipment (UE) such as devices in a carrier aggregation plus multi SIM scenario or any other devices (even single SIM) that support multiple radio access technologies (RATs). Specifically, the present disclosure provides methods and apparatuses for improved throughput for network subscriptions in DSDS wireless devices or devices with multiple RATs by handling tuning away using primary and secondary cells (PCELL and SCELL) in a carrier aggregation scenario in a more efficient way. The present method and apparatus is aimed at deciding which Cell to relinquish in a carrier aggregation (CA) scenario for tuning away to another RAT. For example, before a UE attempts to use a second SIM and tune away in a dual SIM dual standby (DSDS) and carrier aggregation scenario, the system will evaluate and compare the PCELL and SCELL throughput performance. If the SCELL performance is better than the PCELL performance, the UE can use a handover command from a network node to interchange the PCELL and SCELL functionality such that the PCELL is used to tune away to the second SIM, while the higher throughput SCELL is maintained for downlink data.

Stated in another way, if the SCELL has higher throughput, it is switched to the function as the PCELL. This method and apparatus will result in less packet loss because of the tune away and more effective use of downlink resources. The monitoring of the PCELL and the SCELL for which one has higher throughput can be done continuously or periodically such that the lower throughput cell is used for tuning away, thereby increasing overall throughput for traffic associated with the first SIM. This continuous or periodic evaluation/monitoring is helpful because either the PCELL or the SCELL could have higher throughput at different times based on various factors. Since tuning away to monitor page slots related to a second subscription does not use significant network resources, the lower throughput cell can be allocated for the tuning away, preserving resources for the first subscription communications that may be ongoing and use more significant network resources.

Generally, embodiments described herein may be applicable to an LTE wireless communication device in which out of two or more subscriptions, one subscription may be tuned into or active at a given time. Particularly, embodiments may be related to a wireless communication device in which one or more subscriptions support and/or share multiple radio access technologies (RATs) (e.g., using a primary cell (PCELL) and secondary cell (SCELL) as disclosed below), and tune-aways are utilized to communicate with the subscriptions in a sequential manner, one at a time. Examples of combinations of possible subscriptions or RATs include, but are not limited to, LTE-and-1×, LTE-and-GSM, SRLTE-and-GSM, SGLTE-and-GSM, or the like.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services, subscriptions, and RATs supported by that network, correlate to one another.

FIG. 1 is a schematic diagram illustrating an example of a communication system in which tuning away can be implemented in accordance with various embodiments. Various embodiments may be implemented within a communication system 100, an example of which is illustrated in FIG. 1. Referring to FIG. 1, a mobile network 102 may associate with a plurality of cellular base stations (e.g., a first base station 130 and a second base station 140). The first base station 130 may broadcast the mobile network 102 in a first serving cell 150. The second base station 140 may broadcast the mobile network 102 in a second serving cell 160. A wireless communication device 110 may be associated with both the first serving cell 150 and the second serving cell 160.

The wireless communication device 110 may be in communication with the mobile network 102 through a first cellular connection 132 to the first base station 130 or through a second cellular connection 142 to the second base station 140. The first base station 130 may be in communication with the mobile network 102 over a wired or wireless connection 134 and the second base station 140 may be in communication with the mobile network 102 over a wired or wireless connection 144.

The first cellular connection 132 and the second cellular connection 142 may be made through two-way wireless communication links. Each of the wireless communication links may be enabled by any suitable protocol including, but not limited to, FDMA, TDMA, CDMA (e.g., 1×, EV-DO), UMTS (e.g., WCDMA, LTE, SRLTE, SGLTE, HSDPA, or the like), GSM (e.g., GPRS, EDGE), Wi-Fi, PCS, and/or another protocol used in a wireless communications network or a data communications network. By way of illustrating with a non-limiting example, a first RAT of a UE may support a LTE, SRLTE, or SGLTE connection/subscription through the first cellular connection 132 or the second cellular connection 142. A second RAT of a UE may support a 1× or GSM connection through the first cellular connection 132 or the second cellular connection 142. Other connections (such as, but not limited to, WCDMA, HSDPA, EVDO, and the like) may be implemented in a similar manner.

Each of the first base station 130 and the second base station 140 may include at least one antenna group or transmission station located in the same or different areas. The at least one antenna group or transmission station may be tasked with signal transmission and reception. Each of the first base station 130 and the second base station 140 may include one or more processors, modulators, multiplexers, demodulators, demultiplexers, antennas, and the like for performing the functions of the base station. In some embodiments, each of the first base station 130 and the second base station 140 may be an access point, Node B, evolved Node B (eNodeB or eNB), Base Transceiver Station (BTS), or the like.

In various embodiments, the wireless communication device 110 may be configured to access the mobile network 102 by virtue of the multi-SIM and/or the multi-mode SIM configuration of the wireless communication device 110 (e.g., via the first cellular connection 132 and the second cellular connection 142). When a SIM corresponding to a subscription is inserted, the wireless communication device 110 may access the mobile network 102 and send/receive communications associated with that subscription or RAT based on the information stored on the SIM.

While the wireless communication device 110 is shown connected to the mobile network 102 via two cellular connections, in other embodiments (not shown), the wireless communication device 110 may establish additional network connections using at least one additional available subscription or RATs.

In some embodiments, the wireless communication device 110 may have RATs to establish a wireless connection with a peripheral device (not shown) used in connection with the wireless communication device 110. For example, the wireless communication device 110 may communicate through a Bluetooth® link with a Bluetooth-enabled personal computing device (e.g., a "smart watch"). In some embodiments, the wireless communication device 110 may establish a wireless connection with a wireless access point (not shown), such as over a Wi-Fi connection. The wireless access point may be configured to connect to the Internet or another network over a wired connection.

Figure 2:
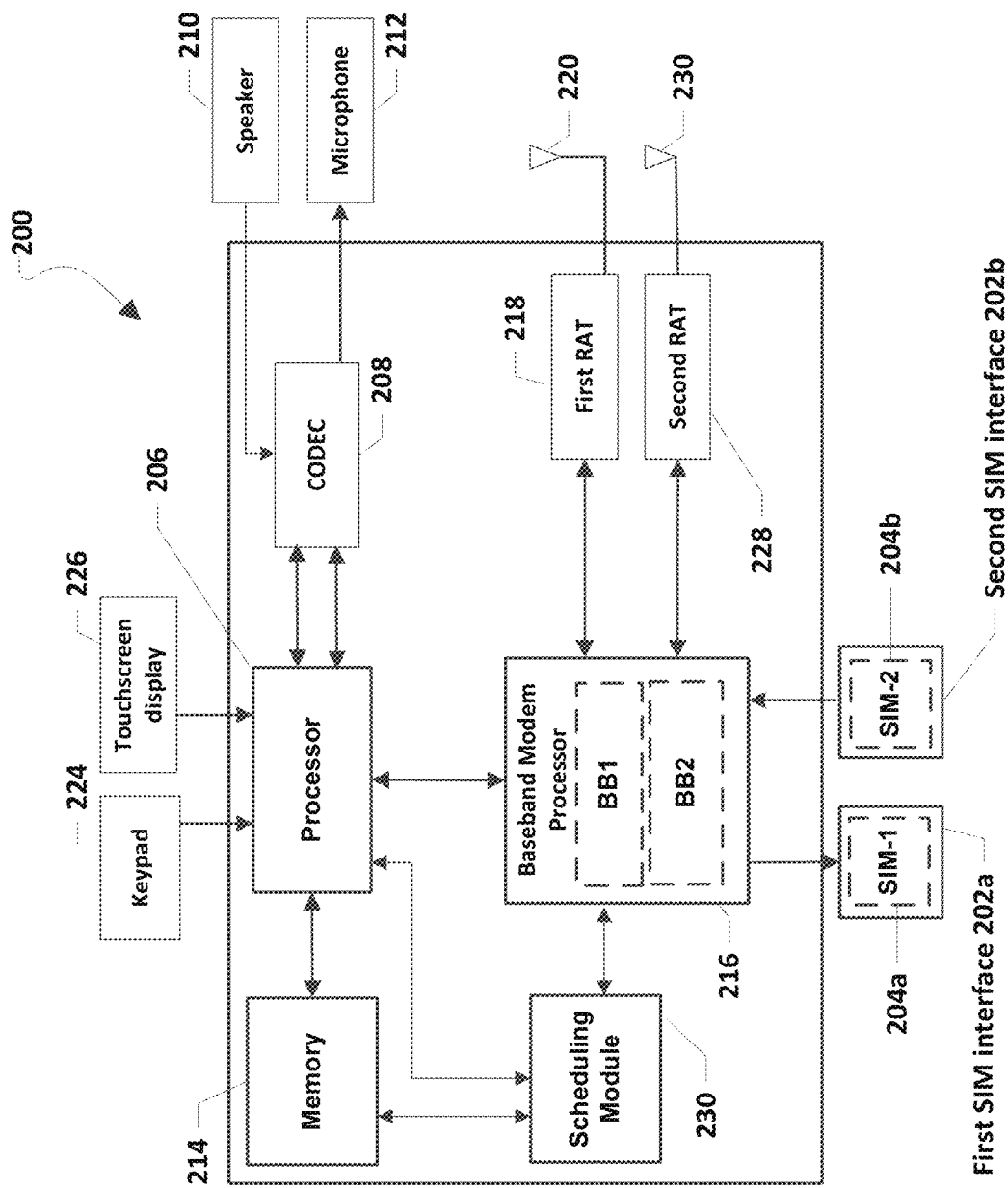
FIG. 2 is a component block diagram illustrating an example of a wireless communication device in which tuning away can be implemented according to various embodiments.

FIG. 2 is a component block diagram illustrating an example of a wireless communication device in which tuning away can be implemented according to various embodiments. According to various embodiments, the wireless communication device 200 may be an example of the wireless communication device 110 as described with reference to FIG. 1. Referring to FIGS. 1-2, the wireless communication device 200 may include a first SIM interface 202a, which may receive a first identity module SIM-1 204a that is associated with the first subscription. The wireless communication device 200 may also include a second SIM interface 202b, which may receive a second identity module SIM-2 204b that is associated with the second subscription.

A SIM in various embodiments may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various embodiments may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 200 may include at least one controller, such as a processor 206, which may be coupled to a coder/decoder (CODEC) 208. The CODEC 208 may in turn be coupled to a speaker 210 and a microphone 212. The processor 206 may also be coupled to at least one memory 214. The processor 206 may include any suitable data processing device, such as a microprocessor. In the alternative, the processor 206 may be any suitable electronic processor, controller, microcontroller, or state machine. The processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions executable by the processor 206. For example, the instructions may include routing communication data relating to the first or second subscription though corresponding RATs (e.g., first RAT 218, second RAT 228). The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The processor 206 and the memory 214 may each be coupled to baseband modem processor 216. The SIMs in the wireless communication device 200 (e.g., the SIM-1 204a and/or the SIM-2 204b) may be associated with at least one radio access technology (RAT). An RAT may include a baseband-RF resource chain including the baseband modem processor 216, which may perform baseband/modem functions for communications on at least one SIM. The baseband modem processor 216 may include one or more amplifiers and radios, referred to generally herein as an RF resource or RF chain in order to utilize RATs such as the first RAT 218 and the second RAT 228.

The embodiments described herein may be applicable to wireless communication devices in which either the first or second subscriptions can share the first RAT 218 and the second RAT 228. Additionally, a first subscription can use/support more than one RAT (e.g., the first RAT 218 and the second RAT 228) simultaneously.

The first RAT 218 and the second RAT 228 may each include at least one transceiver that perform transmit/receive functions for the associated SIMs 204a, 204b of the wireless communication device 200. The first RAT 218 and the second RAT 228 may include separate transmit and receive circuitry, or may include one or more transceivers that combine transmitter and receiver functions. The first RAT 218 and the second RAT 228 may be coupled to wireless antennae 220 and 230, respectively. The first RAT 218 and the second RAT 228 may also each be coupled to the baseband modem processor 216.

In some embodiments, the processor 206, the memory 214, the baseband modem processor 216, the first RAT 218, and the second RAT 228 may be included in the wireless communication device 200 as a system-on-chip. In some embodiments, the SIMs 202a, 202b and their corresponding interfaces 204a, 204b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication therebetween.

The wireless communication device 200 may include a scheduling module 230 configured to manage and/or schedule activities of the first and the second subscriptions on the first RAT 218 and the second RAT 228 and the baseband modem processor 216. For example, the scheduling module 230 may be configured perform one or more processes described herein with respect to scheduling tune-aways to the second subscription on either the first RAT 218 or the second RAT 228, determining a length of the tune-away, determining the maximum count for sending the scheduling requests, transmitting the scheduling requests, initiating the uplink data RACH process, and the like.

In some embodiments, the scheduling module 230 may be implemented with the processor 206. For example, the scheduling module 230 may be implemented as a software application stored within the memory 214 and executed by the processor 206. Accordingly, such embodiments can be implemented with minimal additional hardware costs. However, other embodiments relate to systems and processes implemented with dedicated hardware specifically configured for performing operations described herein with respect to the scheduling module 230. For example, the scheduling module 230 may be implemented as a separate processing component (i.e., separate from the processor 206). The scheduling module 230 may be coupled to the memory 214, the processor 206, the baseband processor 216, and/or the first and second RATs 218, 228 for performing the functions described herein.

Hardware and/or software for the functions may be incorporated in the wireless communication device 200 during manufacturing, for example, as a part of a configuration of an original equipment manufacturer (OEM) of the wireless communication device 200. In further embodiments, such hardware and/or software may be added to the wireless communication device 200 post-manufacture, such as by installing one or more hardware devices and/or software applications onto the wireless communication device 200.

In embodiments not shown in the FIGS., the wireless communication device 200 may include, among other things, additional SIMs, SIM interfaces, at least another RF resource associated with the additional SIMs, and additional antennas for connecting to additional mobile networks.

Figure 3:
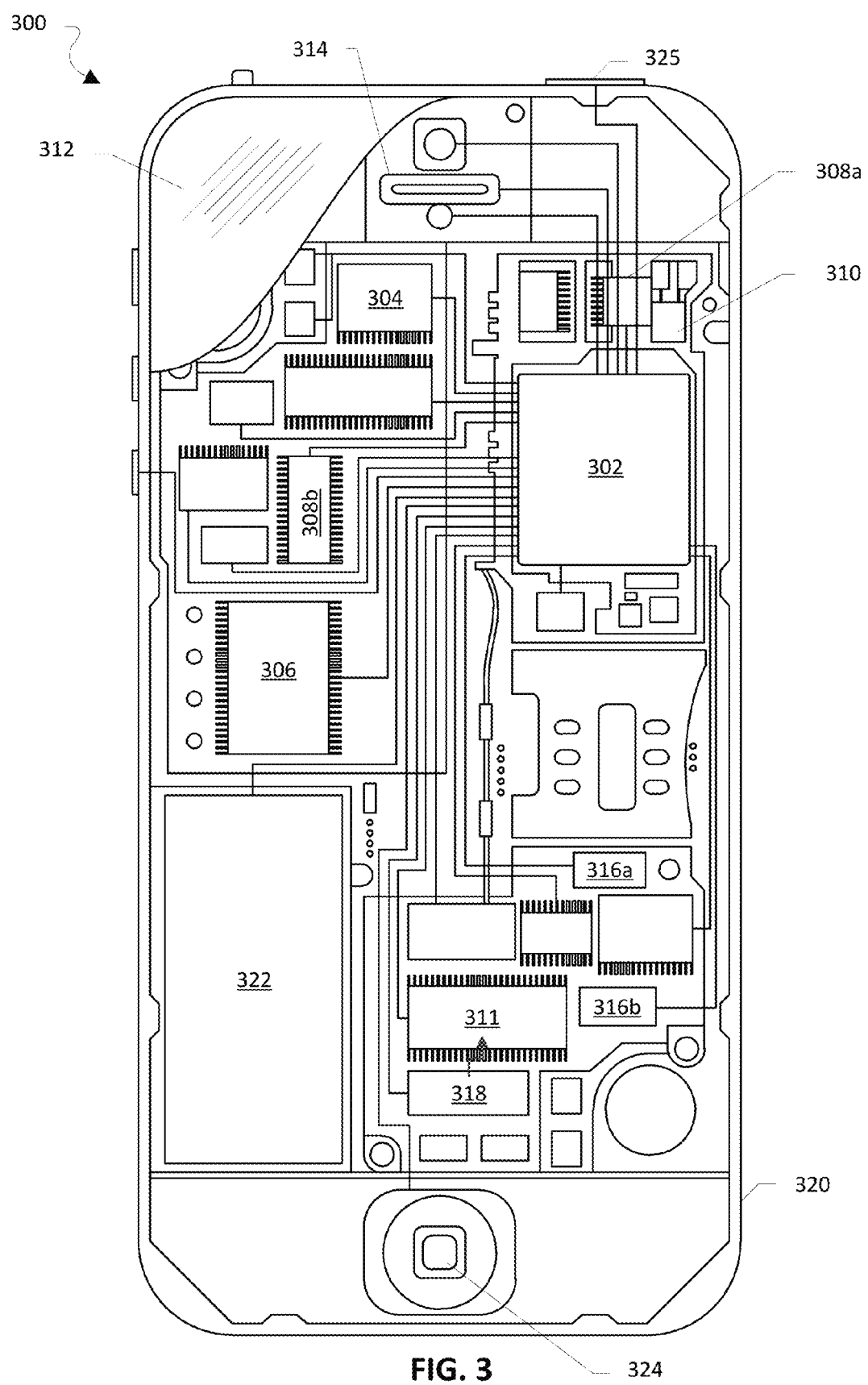
FIG. 3 is a component block diagram of a wireless communication device in which tuning away can be implemented in accordance with an exemplary embodiment.

The various embodiments may be implemented in any of a variety of wireless communication device 200, an example of which is illustrated in FIG. 3, as wireless communication device 300. As such, the wireless communication device 300 may implement the process and/or the apparatus of the various figures, as described herein.

The wireless communication device 300 may include a processor 302 coupled to a touchscreen controller 304 and an internal memory 306. The processor 302 may be one or more multi-core integrated circuits designated for general or specific processing tasks. The memory 306 may be volatile or non-volatile memory, and may also be secure and/or encrypted memory, or unsecure and/or unencrypted memory, or any combination thereof. The touchscreen controller 304 and the processor 302 may also be coupled to a touchscreen panel 312, such as a resistive-sensing touchscreen, capacitive-sensing touchscreen, infrared sensing touchscreen, etc. Additionally, the display of the wireless communication device 300 need not have touch screen capability.

The wireless communication device 300 may have one or more cellular network transceivers 308a, 308b coupled to the processor 302 and to at least one antenna 310 and configured for sending and receiving cellular communications. The transceivers 308a, 308b and antenna 310 may be used to implement the various embodiment methods disclosed herein. The cellular network transceivers 308a, 308b may be radio frequency (RF) resources that enable certain types of radio access technologies (RAT) to operate, including RATs 218 and 228. The antenna 310 may be the antennas 220 and 230. The wireless communication device 300 may include two or more SIM cards 316a, 316b, corresponding to SIM-1 204a and SIM-2 204b, coupled to the transceivers 308a, 308b and/or the processor 302. The wireless communication device 300 may include a cellular network wireless modem chip 311 (e.g., the baseband modem processor 216) that enables communication via at least one cellular network and is coupled to the processor 302.

The wireless communication device 300 may include a peripheral device connection interface 318 coupled to the processor 302. The peripheral device connection interface 318 may be singularly configured to accept one type of connection, or multiply configured to accept various types of physical and communication connections, common or proprietary, such as USB, FireWire, Thunderbolt, or PCIe. The peripheral device connection interface 318 may also be coupled to a similarly configured peripheral device connection port (not shown).

The wireless communication device 300 may also include speakers 314 for providing audio outputs. The wireless communication device 300 may also include a housing 320, constructed of a plastic, metal, or a combination of materials, for containing all or some of the components discussed herein. The wireless communication device 300 may include a power source 322 coupled to the processor 302, such as a disposable or rechargeable battery. The rechargeable battery may also be coupled to a peripheral device connection port (not shown) to receive a charging current from a source external to the wireless communication device 300. The wireless communication device 300 may also include a physical button 324 for receiving user inputs. The wireless communication device 300 may also include a power button 325 for turning the wireless communication device 300 on and off.

FIGS. 4-7 demonstrate various carrier aggregation (CA) schemes in which the disclosed apparatuses, systems, computer readable media, and methods may be used according to various embodiments. CA allows aggregation of frequency bands for wireless communications. These different frequency bands may be referred to as component carriers, and may overlap, may butt up against one other in the frequency spectrum, or may have gaps of frequency bands between them. Efficient use of CA may depend on various factors, such as density of an area (e.g., urban, suburban, rural), whether common antennas can be used for a given frequency band, whether there are certain hot spots in an area, etc. In one example, a frequency band provides significant overall coverage with primary cells (PCELL) while a different frequency band may provide secondary cells (SCELL) to supplement the coverage where the PCELL coverage is weak or hot spots are desired. Various configurations are possible and may have advantages for different applications. In other words, the PCELL and the SCELL may be configured in a carrier aggregation scheme such that any communications over the PCELL is associated with a first component carrier or frequency band and the secondary cell is associated with a second component carrier or frequency band, and these bands may be completely different, have some overlap, or be completely overlapping with respect to frequency ranges.

In particular, FIGS. 4-7 show different configurations for a cellular network with primary cells (PCELL) and secondary cells (SCELL) through which a wireless communication device (e.g., wireless communication devices 110, 200, 300) may communicate with a cellular network. The mobile communication device may have one or more subscription associated with one or more SIM cards, and the mobile communication device may support different RATs for its one or more subscriptions. For example, a subscription may support an LTE RAT as well a 1x/G/W RAT. The mobile communication device may support these multiple RATs simultaneously utilizing a carrier aggregation scheme, such as those shown in FIGS. 4-7, where one RAT is supported and communications are sent/received via a PCELL and the second RAT is supported and communications are sent/received via an SCELL. Depending on a type of carrier aggregation scheme, location of a wireless communication device within a cellular network, noise, type of RAT, frequency band of a particular cell, and many other factors, a PCELL and SCELL may have different throughput rates.

As disclosed herein, a wireless communication device may measure those throughput rates and use that information to prioritize RATs and/or subscriptions that have or use higher levels of information/data throughput. In other words, monitoring for one or more page slots (e.g., during tuning away) may not benefit from additional throughput as other communications (e.g., a phone call, LTE data downlink). FIGS. 4-7 illustrate just four possible carrier aggregation (CA) schemes that have PCELLs and SCELLS, and which may give rise to differing throughput levels on the PCELLs and SCELLs. These scenarios are not exhaustive. Other types of scenarios are contemplated, both with different geometries and with additional components such as repeaters and femto cells.

Figure 4:
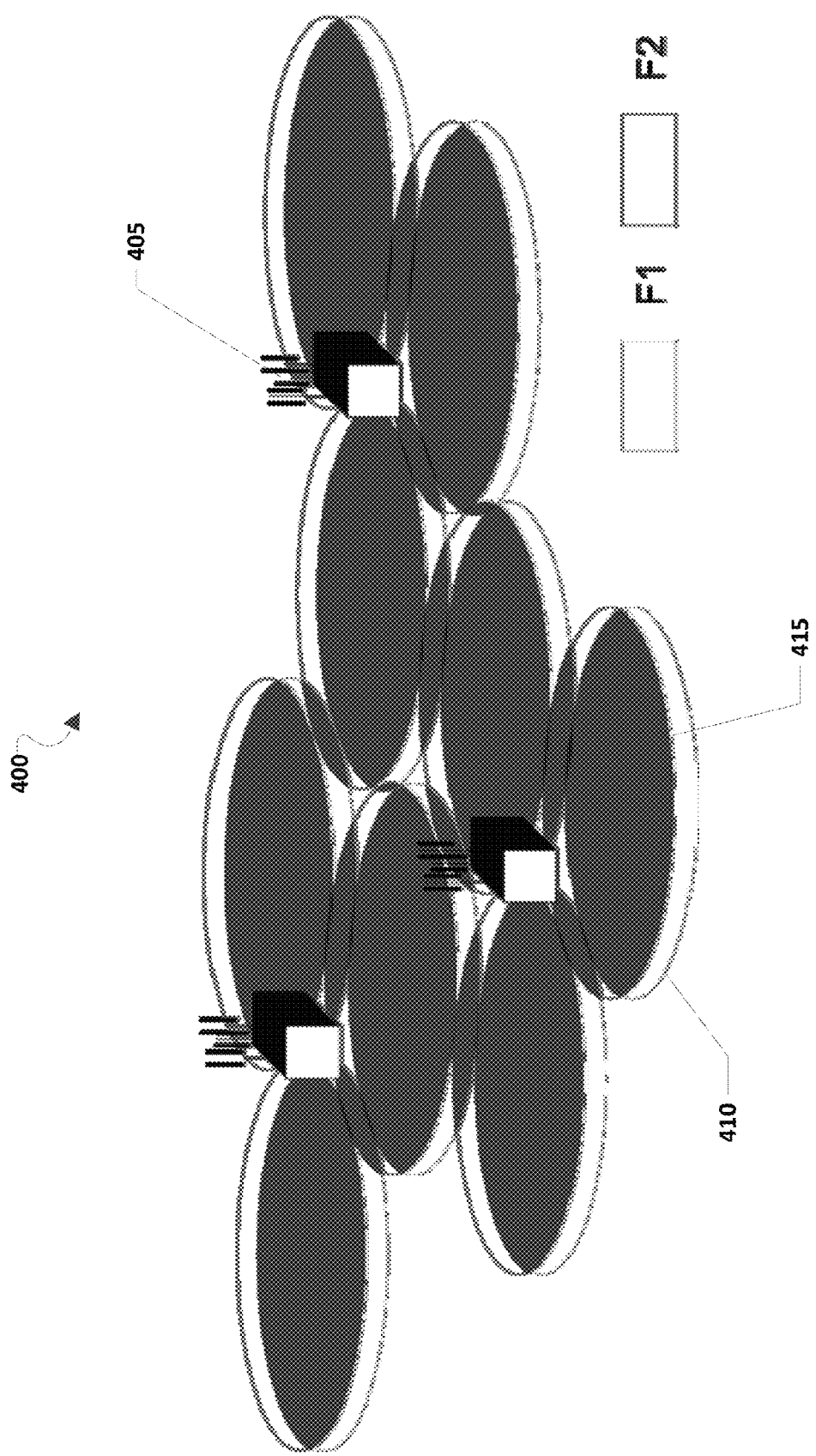
FIG. 4 is a schematic diagram illustrating co-located and overlaid primary and secondary cells of a carrier aggregation scheme in accordance with various embodiments.

FIG. 4 is a schematic diagram illustrating co-located and overlaid primary and secondary cells of a carrier aggregation scheme 400 in accordance with various embodiments. The carrier aggregation (CA) scheme 400 includes at least one network node 405, which may be a base station, such as the first base station 130 or the second base station 140 of FIG. 1. The CA scheme 400 also includes primary cells (PCELL) 410 and secondary cells (SCELL) 415 that are serviced by network nodes such as the network node 405. Here, the PCELLs 410 and SCELLs 415 are overlaid and co-located and provide nearly the same coverage. In one possible embodiment of the CA scheme 400, the PCELLs 410 and SCELLs 415 may be of the same frequency band.

Figure 5:
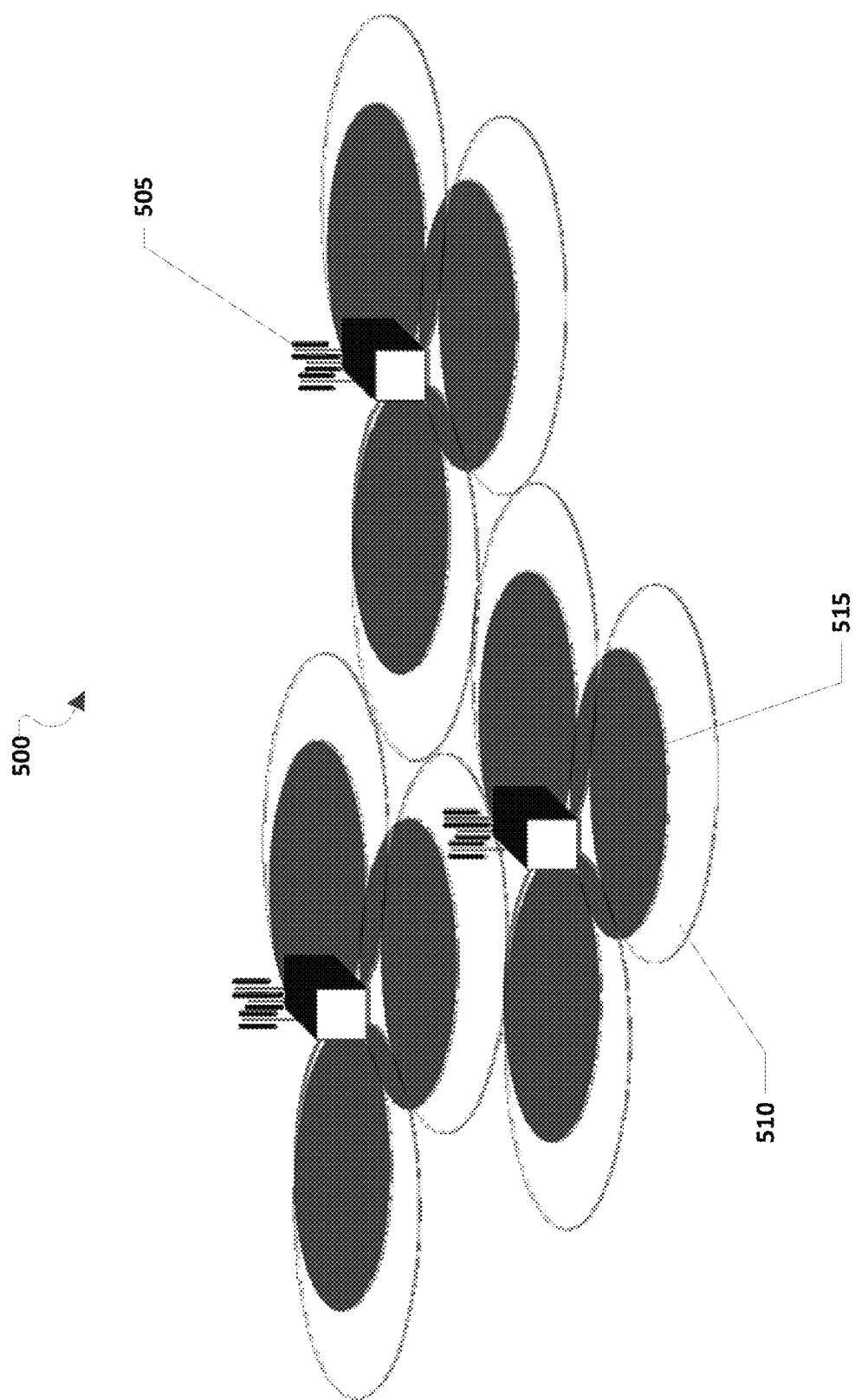
FIG. 5 is a second schematic diagram illustrating co-located and overlaid primary and secondary cells of a carrier aggregation scheme in accordance with various embodiments.

FIG. 5 is a second schematic diagram illustrating co-located and overlaid primary and secondary cells of a carrier aggregation scheme in accordance with various embodiments. The carrier aggregation (CA) scheme 500 includes at least one network node 505, which may be a base station, such as the first base station 130 or the second base station 140 of FIG. 1. The CA scheme 500 also includes primary cells (PCELL) 510 and secondary cells (SCELL) 515 that are serviced by network nodes such as the network node 505. Here, the PCELLs 510 and SCELLs 515 are overlaid and co-located, but the SCELLs 515 have smaller coverage than the PCELLs 510. In one possible example, this scenario may occur when the SCELLs 515 have a larger path loss than the PCELLs. In such a scenario, the PCELLs 510 provide sufficient coverage and the SCELLs provide additional throughput and mobility is performed based on the coverage from the PCELLs 510. In one possible embodiment of the CA scheme 500, the PCELLs 510 and SCELLs 515 may be of different frequency bands.

Figure 6:
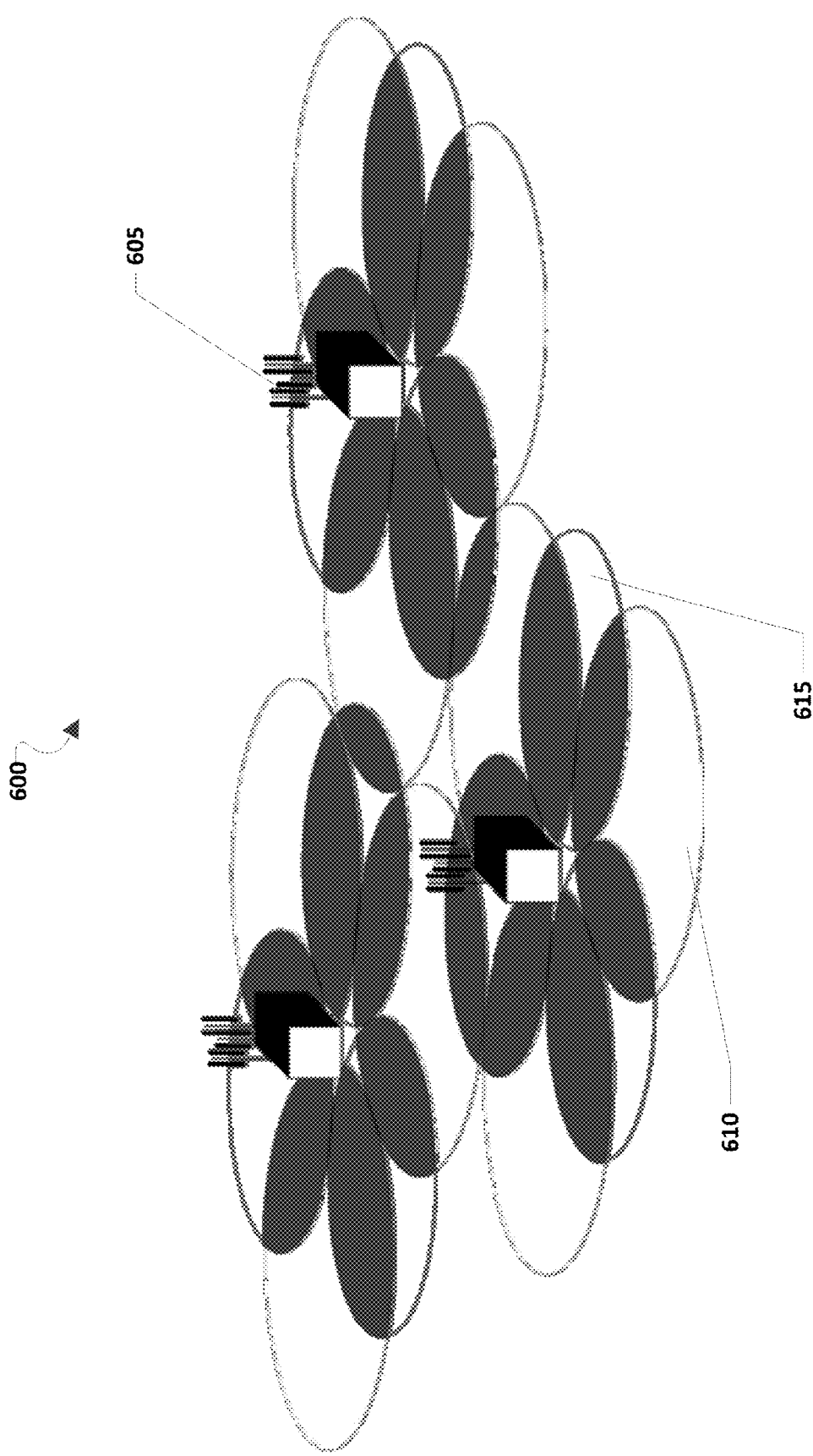
FIG. 6 is a schematic diagram illustrating co-located primary and secondary cells of a carrier aggregation scheme to cover cell edges in accordance with various embodiments.

FIG. 6 is a schematic diagram illustrating co-located primary and secondary cells of a carrier aggregation scheme to cover cell edges in accordance with various embodiments. The carrier aggregation (CA) scheme 600 includes at least one network node 605, which may be a base station, such as the first base station 130 or the second base station 140 of FIG. 1. The CA scheme 600 also includes primary cells (PCELL) 610 and secondary cells (SCELL) 615 that are serviced by network nodes such as the network node 605. Here, the PCELLs 610 and SCELLs 615 are co-located, but antennas of the SCELLs 515 are directed to cell boundaries of the PCELLs 610. This can increase throughput at the cell edges of both the PCELLs 610 and the SCELLs 615. In one possible embodiment of the CA scheme 600, the PCELLs 610 and SCELLs 615 may be of different frequency bands.

Figure 7:
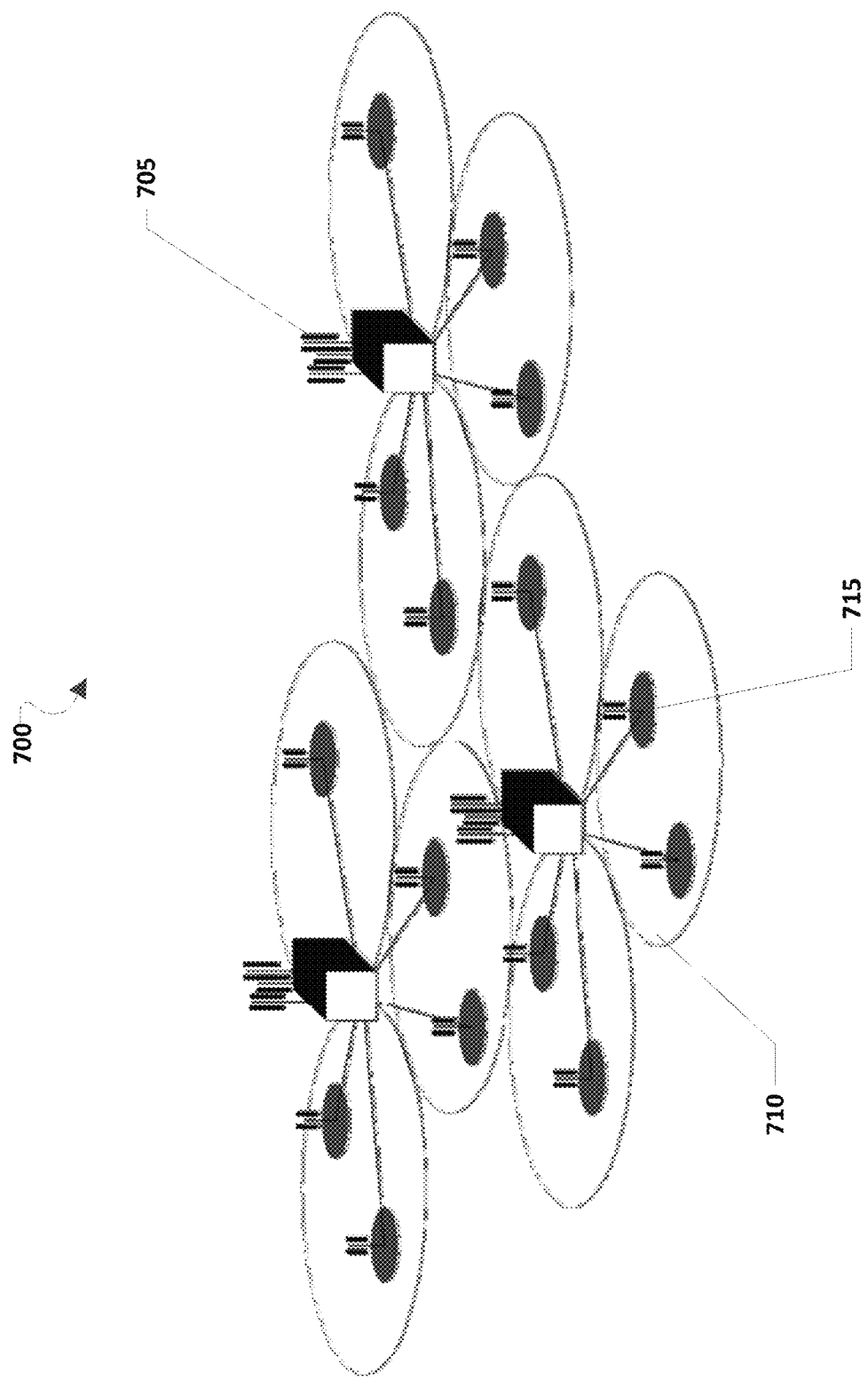
FIG. 7 is a schematic diagram illustrating macro and hot spot coverage primary and secondary cells of a carrier aggregation scheme in accordance with various embodiments.

FIG. 7 is a schematic diagram illustrating macro and hot spot coverage primary and secondary cells of a carrier aggregation scheme in accordance with various embodiments. The carrier aggregation (CA) scheme 700 includes at least one network node 705, which may be a base station, such as the first base station 130 or the second base station 140 of FIG. 1. The CA scheme 700 also includes primary cells (PCELL) 710 and secondary cells (SCELL) 715 that are serviced by network nodes such as the network node 705. Here, the PCELLs 710 provide macro coverage and the SCELLs 715 provide throughput as hot spots within the PCELLs 710. Mobility may be performed based on the coverage from the PCELLs 710. In one possible embodiment of the CA scheme 700, the PCELLs 710 and SCELLs 715 may be of different frequency bands.

In a carrier aggregation (CA) schemes, user equipment (UE) may relinquish radio access technology (RAT) on a secondary cell (SCELL) tune away to a second radio access technology (RAT) leading to suspension of downlink data for the first RAT on the SCELL. This leaves downlink data for the first RAT to be passed through a primary cell (PCELL). However, there can be a possibility that a PCELL performance for data downlink could be worse than SCELL. In such a scenario, suspending downlink activity on SCELL because of tuning away can impact downlink throughput negatively. The present disclosure presents methods and apparatuses for improved tune away in UE such as devices in a carrier aggregation plus multi SIM scenario or any other devices (even single SIM) that support multiple radio access technologies (RATs). Specifically, the present disclosure provides methods and apparatuses for improved throughput for network subscriptions in DSDS wireless devices or devices with multiple RATs by handling tuning away using primary and secondary cells (PCELL and SCELL) of a carrier aggregation scenario in a more efficient way. For example, before a UE attempts to use a second SIM and tune away in a dual SIM dual standby (DSDS) and carrier aggregation scenario, the system will evaluate and compare the PCELL and SCELL throughput performance. If the SCELL performance is better than the PCELL performance, the UE can use a handover command from a network node to interchange the PCELL and SCELL functionality such that the PCELL is used to tune away for the second SIM, while the higher throughput SCELL is maintained for downlink data. Stated in another way, if the SCELL has higher throughput, it is switched to the function as the PCELL. The monitoring of the PCELL and the SCELL for which one has higher throughput can be done continuously or periodically such that the lower throughput cell is used for tuning away, thereby increasing overall throughput for traffic associated with the first SIM. This continuous or periodic evaluation/monitoring is helpful because either the PCELL or the SCELL could have higher throughput at different times based on various factors. Since tuning away to monitor page slots related to a second subscription does not use significant network resources, the lower throughput cell can be allocated for the tuning away, preserving resources for the first subscription communications that may be ongoing and use more significant network resources. In one example according to various embodiments disclosed herein, a first subscription may be a carrier aggregated LTE and the second subscription may be a generic subscription.

Figure 8:
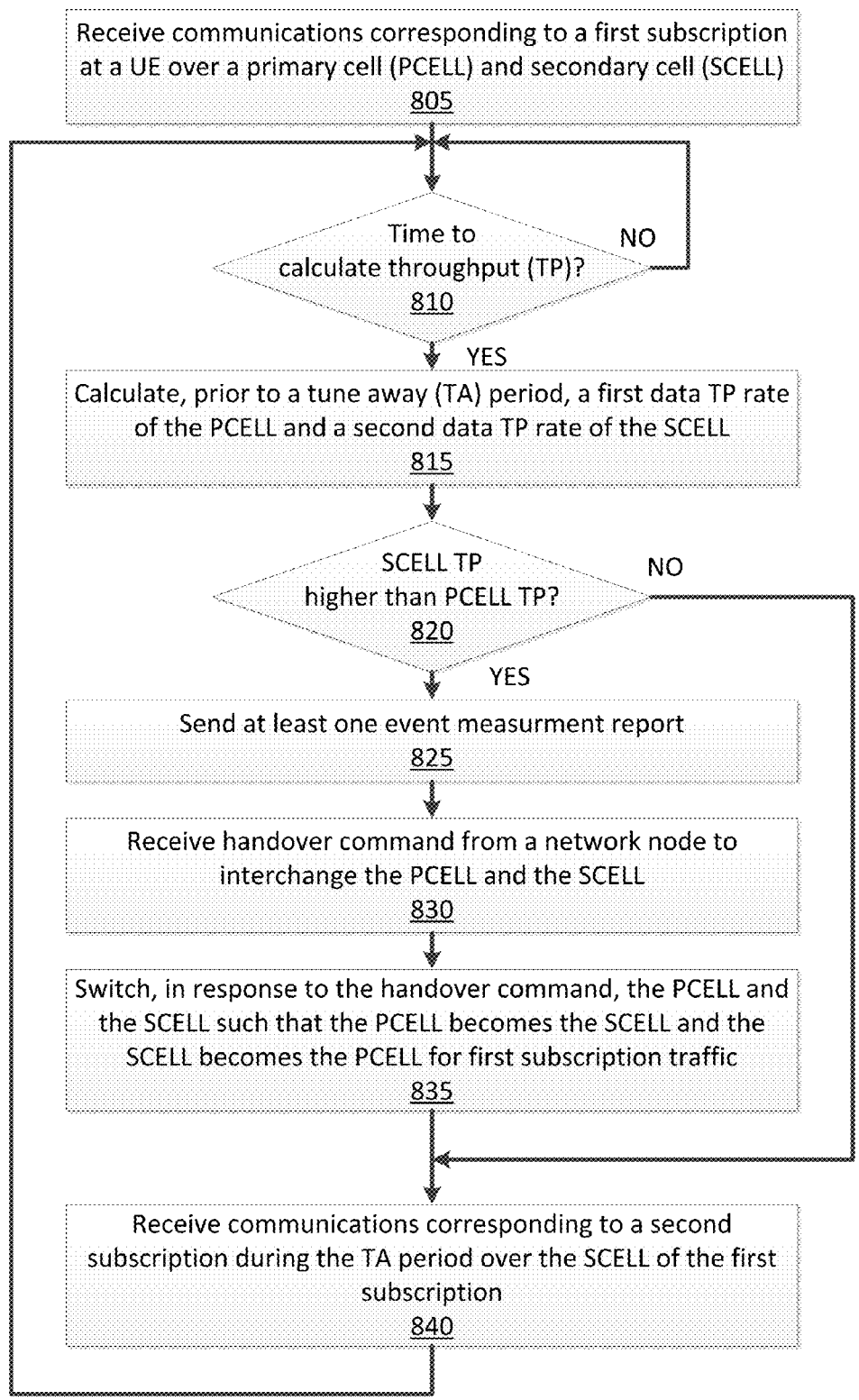
FIG. 8 is a flow diagram depicting operations performed by a user equipment (UE) in the technique of measuring throughput prior to tuning away in a carrier aggregation plus dual SIM dual standby (DSDS) scenario in accordance with various embodiments.

FIG. 8 is a flow diagram depicting operations 800 performed by a user equipment (UE) in the technique of measuring throughput prior to tuning away in a carrier aggregation plus dual SIM dual standby (DSDS) scenario in accordance with various embodiments. Additional, fewer, or different operations may be performed, depending on the particular embodiment.

In an operation 805, user equipment (UE) (e.g., wireless communication devices 110, 200, 300) receives from a node of a network (e.g., the first base station 130, the second base station 140, the node 405, the node 505, the node 605, the node 705) communications corresponding to a first subscription over a PCELL and an SCELL (e.g., the first serving cell 150, the second serving cell 160, the nodes 410, 415, 510, 515, 610, 615, 710, 715). The communications may include pages, text data, internet data, voice data, or any other types of communications. The node of the network may be an evolved node B or eNB.

In an operation 810, the UE determines whether it is the proper time to calculate throughput (TP) according to the various embodiments disclosed herein. For example, the UE may be programmed to calculate the throughput of the PCELL and SCELL based on a fixed schedule, such as a network paging schedule. In another example, the UE may be programmed to calculate throughput of the PCELL and the SCELL during mobility after the UE has relocated to a different cell and a handover to a different PCELL has been completed. In another example, the UE may be programmed to determine throughput of the PCELL and the SCELL a certain predetermined threshold of time (e.g., 20 milliseconds (ms)) before tuning away of the SCELL. If the UE is not programmed to calculate throughput at a certain time, the UE continues waiting for the proper time. If the UE determines it is the proper time to calculate throughput of the PCELL and SCELL, the UE performs an operation 815.

In the operation 815, the UE calculates, prior to a tune away period, a first data throughput rate of the PCELL and a second data throughput rate of the SCELL. As indicated above, this calculation of the first data throughput rate and the second data throughput rate may occur, continuously, on a set schedule during the reception of the communications over the primary cell and the secondary cell associated with the first subscription, or a set predetermined threshold of time before a tune away period. The calculated first and second data throughput rates may be calculated as an average throughput rate of data transmitted over the corresponding PCELL or SCELL. The average data throughput rates may be calculated for each cell based on total bits received in a current paging cycle of the second subscription over the corresponding cell and a time duration in which the corresponding cell is monitored during the current paging cycle. In an additional example, the throughput rates of the PCELL may include an average throughput rate of data transmitted over the primary cell and an additional predetermined hysteresis factor. As non-limiting examples, the hysteresis factor may be 5 megabytes per second (mbps) or 10 mbps. Such a factor may be added to prevent switching of the PCELL or SCELL when the performance of the two cells are very close, or based on design factors where an additional loss of throughput is assumed for the SCELL but is not actually capable of being calculated by the SCELL (i.e., additional hysteresis is added where the SCELL calculation may not be perfectly accurate).

In an operation 820, the UE determines if the calculated SCELL throughput is higher than the PCELL throughput (which can include the additional hysteresis factor). In one example, this determination may occur by the UE comparing the first data throughput rate of the PCELL and the second data throughput rate of the SCELL every paging cycle of a radio access technology (RAT) that is associated with a second subscription of the UE. In various embodiments (such as the one discussed below with respect to FIG. 11), the UE may monitor/compare data throughput rates for the PCELL and the SCELL according to a page cycle of an RAT that will be tuned away for, regardless of whether the UE has one or more subscriptions. In this way, the UE can monitor the throughput of the SCELL and PCELL according to particular times when the UE would be more likely to tune away for an RAT. If the SCELL throughput is higher than the PCELL throughput, the UE sends at least one event measurement report to a network node in an operation 825. For example, the event measurement report may be at least one altered LTE A5 event measurement report comprising altered cell measurement values, i.e., it may have altered measurement values for PCELL and SCELL. In this way, the node can generate a handover command to be sent to the UE so the PCELL and the SCELL can be switched using a handover procedure at the UE. If the UE determines that the SCELL throughput is not higher than the PCELL (or is not higher than the throughput rate of the PCELL plus a hysteresis factor), the UE proceeds to an operation 840 to begin tuning away. The operation 840 is discussed further below.

In an operation 830, the handover command from the network node to interchange the PCELL and the SCELL is received by the UE. The handover command may include instructions to the UE to interchange the PCELL and the SCELL. Such instructions may invoke pre-stored handover instructions that are already located on the UE, and/or the instructions may include the actual steps to be executed by the UE to implement the switch/interchange between the PCELL and the SCELL.

In an operation 835, the UE switches, in response to receiving the handover command, the PCELL and the SCELL such that the PCELL becomes the SCELL and the SCELL becomes the PCELL for first subscription traffic. For example, before the handover/interchange, the UE may be engaged in LTE data downlink (e.g., looking at websites) related to a first subscription, and the communications are being sent/received between the node and the UE via the PCELL. The UE in this example may be simultaneously sending/receiving communications (e.g., text messages) to/from a node related to the first subscription via the SCELL. If the UE determines that the SCELL has higher throughput than the PCELL. The UE may send the altered measurement reports (operation 825), receive the handover command from the node (operation 830), and switch the PCELL and SCELL (operation 835. In this way, a RAT (in this case LTE data downlink) that may use more throughput than a second RAT (in this case text message protocol) can be prioritized on the cell that has a higher throughput. In this way, the SCELL now functions as the PCELL so that the LTE data downlink can occur over the cell with higher throughput.

In an operation 840, the UE receives communications, after switching the PCELL and the SCELL, corresponding to the second subscription during the tune away period over the SCELL of the first subscription, which was calculated to have a lower throughput rate than the PCELL. Here, the actual tune away related to a second subscription occurs. In other embodiments (e.g., embodiments discussed below with respect to FIG. 11 below), the UE may not tune away for communications related to a second subscription, but may merely tune away for different RATs related to the first subscription. Such tune away may further occur as described below with respect to FIG. 10.

Figure 9:
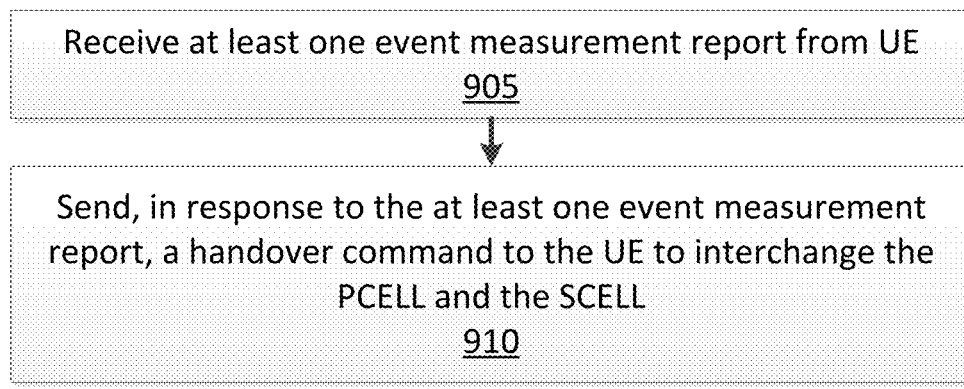
FIG. 9 is a flow diagram depicting operations performed by a network node in the technique of sending a handover command to a UE in accordance with various embodiments.

FIG. 9 is a flow diagram depicting operations 900 performed by a network node in the technique of sending a handover command to a UE in accordance with various embodiments. Additional, fewer, or different operations may be performed, depending on the particular embodiment.

In an operation 905, a network node (e.g., the first base station 130, the second base station 140, the node 405, the node 505, the node 605, the node 705) receives at least one event measurement report from a UE (e.g., wireless communication devices 110, 200, 300). The network node may be an enhanced node B (eNB), for example. For example, the event measurement reports may be altered A5 measurement reports. Such reports can trigger handover between PCELL and SCELL in CA networks. An A5 report can be sent when a first cell (e.g., cell 150) becomes worse than (or unusable compared to) a second cell (e.g., 160). This often occurs when a UE is moving between cell areas. A5 reports are often sent when measured Reference Signal Received Power (RSRP) or Reference Signal Received Quality (RSRQ) is low. However, as demonstrated below with respect to FIGS. 12 and 13, there are at least some instances where an SCELL may have higher throughput than a PCELL even if the RSRP and/or RSRQ indicates that the PCELL cell condition is better. In such an instance, an A5 report may not be sent to the network and an interchange would not occur. However, if a UE measures throughputs itself and discovers that an SCELL has higher throughput, the UE can alter the measurements of A5 report to make it appear as though RSRP or RSRQ is worse in the PCELL (or better in the SCELL) than it actually is in order to facilitate an interchange and take advantage of whichever cell has the higher throughput. In embodiments of the present disclosure, the UE sends altered A5 reports in order to get the network node to send handover commands so that the UE can switch a PCELL and SCELL as disclosed herein. Such reports can be received, for example, when a UE executes the operation 825 discussed above.

In an operation 910, the network node sends, in response to the at least one event measurement report, a handover command to the UE to interchange the PCELL and the SCELL. The handover command may be received by the UE as in the operation 830 discussed above and implemented according to the operation 835 discussed above.

Figure 10:
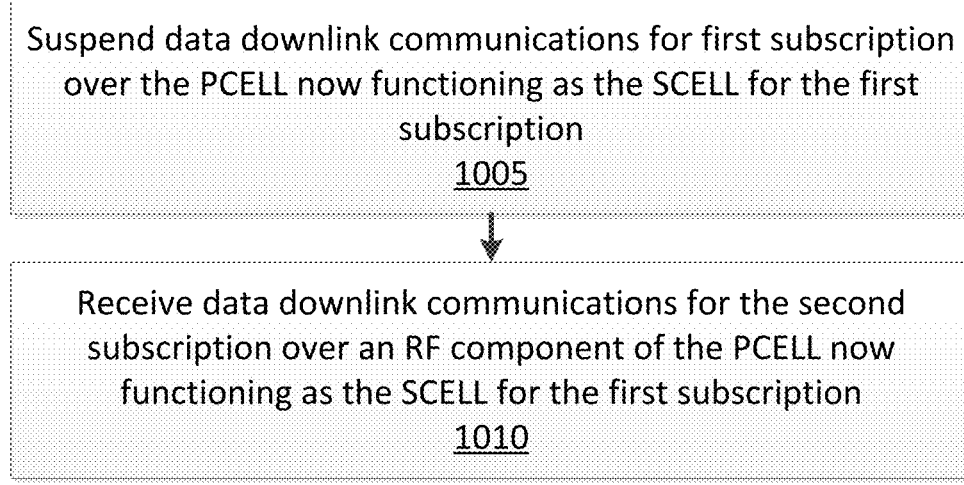
FIG. 10 is a flow diagram depicting operations performed by a UE in the technique of switching primary and secondary cells in response to a handover command in accordance with various embodiments.

FIG. 10 is a flow diagram depicting operations 1000 performed by a UE in the technique of switching primary and secondary cells in response to a handover command in accordance with various embodiments. Additional, fewer, or different operations may be performed, depending on the particular embodiment. FIG. 10 describes a tuning away procedure after a PCELL and SCELL have been switched/interchanged, such as according to FIG. 8 as described above.

In an operation 1005, the UE suspends data downlink communications for a first subscription over a PCELL now functioning as an SCELL for the first subscription. In an operation 1010, the UE receives data downlink communications for a second subscription over a radio frequency (RF) component of the primary cell now functioning as the secondary cell for the first subscription, wherein the downlink communications for the second subscription comprises monitoring at least one page slot. In other words, the system can tune away to receive communications associated with an RAT of the second subscription through the current SCELL (which was formerly the PCELL, because the former PCELL was found to have lower throughput than the former SCELL). In alternate embodiments, such as the one described below with respect FIG. 11, the RAT being tuned away to may correspond to any subscription, such as the first subscription, such that the methods and systems disclosed herein may be used with UE's that have one or more subscriptions (and associated SIM card(s)).

Figure 11:
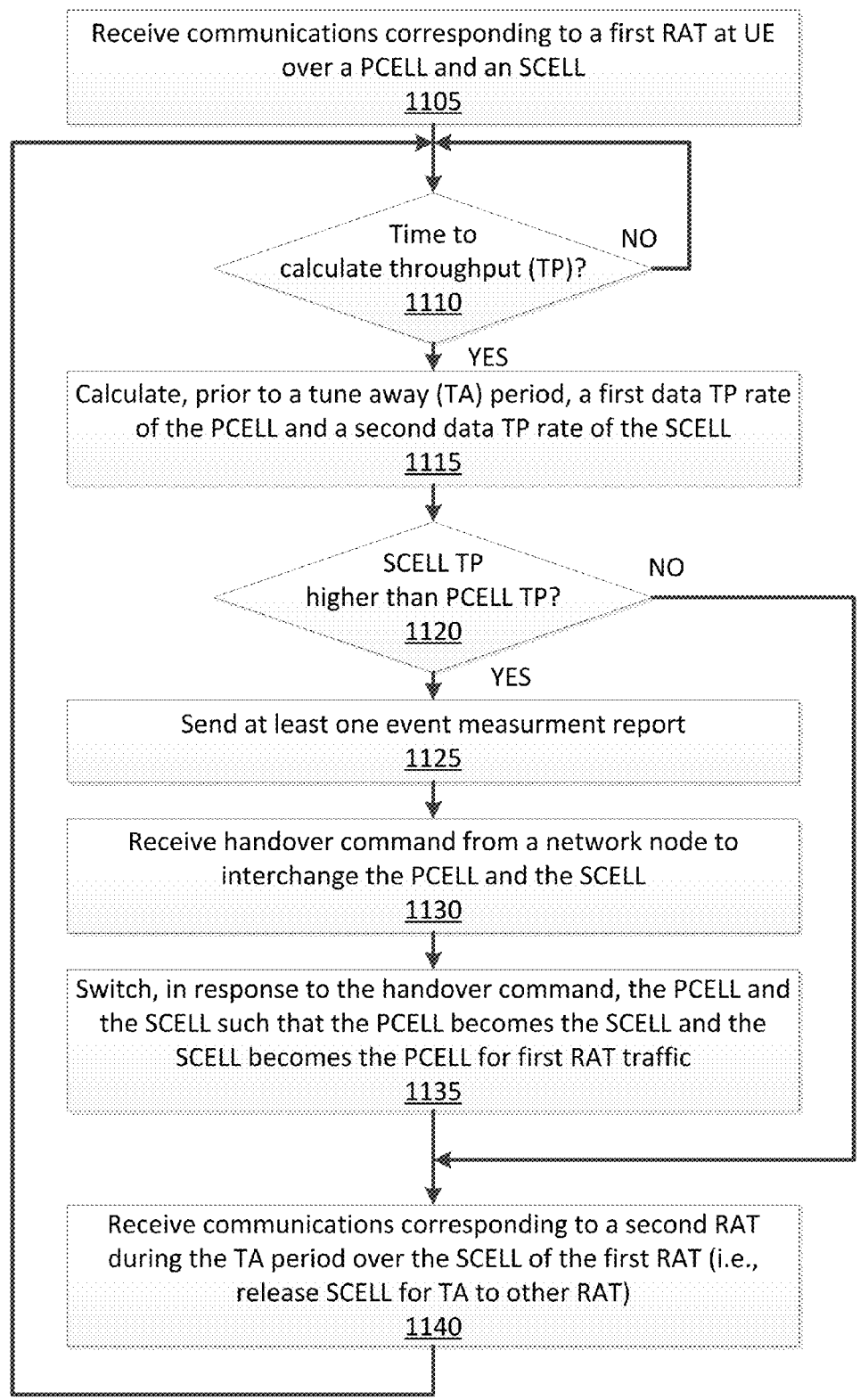
FIG. 11 is a flow diagram depicting operations performed by a user equipment (UE) in the technique of measuring throughput prior to tuning away in a multiple radio access technology (RAT) scenario in accordance with various embodiments.

FIG. 11 is a flow diagram depicting operations 1100 performed by a user equipment (UE) in the technique of measuring throughput prior to tuning away in a multiple radio access technology (RAT) scenario in accordance with various embodiments. Additional, fewer, or different operations may be performed, depending on the particular embodiment. The method of FIG. 11 is, in some ways, similar to the method described above with respect to FIG. 8. However, as discussed above, FIG. 11 describes some embodiments that tune away to RATs according to the disclosed embodiments, but a UE may not have multiple subscriptions. For example, a UE that may apply the method of FIG. 11 may have a first RAT that is LTE and a second RAT that is 1×/G/W.

In an operation 1105, a UE (e.g., wireless communication devices 110, 200, 300) receives communications via a node (e.g., the first base station 130, the second base station 140, the node 405, the node 505, the node 605, the node 705) corresponding to a first RAT of a first subscription at over a PCELL and an SCELL (e.g., the first serving cell 150, the second serving cell 160, the nodes 410, 415, 510, 515, 610, 615, 710, 715). In an operation 1110, the UE determines whether it is the proper time to calculate throughput (TP) according to the various embodiments disclosed herein. This operation may be similar to the operation 810 as described above.

In an operation 1115, the UE calculates, prior to a tune away period, a first data throughput rate of the PCELL and a second data throughput rate of the SCELL. In an operation 1120, the UE determines if the calculated SCELL throughput is higher than the PCELL throughput (which can include the additional hysteresis factor as discussed above).

In an operation 1125, the UE sends at least one event measurement report to the network node if the second data throughput rate is higher than the first data throughput rate. In an operation 1130, the UE receives a handover command from the network node to interchange the PCELL and the SCELL. In an operation 1135, the UE switches, in response to receiving the handover command, the PCELL and the SCELL such that the PCELL becomes the SCELL and the SCELL becomes the PCELL for first RAT traffic.

In an operation 1140, the tuning away takes place and the UE receives communications, after switching the primary cell and the secondary cell, corresponding to a second RAT of the first subscription during the tune away period over the secondary cell of the first RAT, which was calculated to have a lower throughput rate than the primary cell. The communications corresponding to the second RAT may include, as just one example, monitoring at least one page slot.

As discussed above and according to the various embodiments disclosed herein, it may be advantageous to switch/interchange PCELLs and SCELLs when an SCELL has higher throughput than a PCELL. In particular, these methods may be valuable when SCELL throughput is higher than a PCELL, but such a difference is not indicated by measurements of RSRP and/or RSRQ. In just one example, the measurements shown and discussed below with respect to FIGS. 12 and 13 indicate one such scenario.

Figure 12:
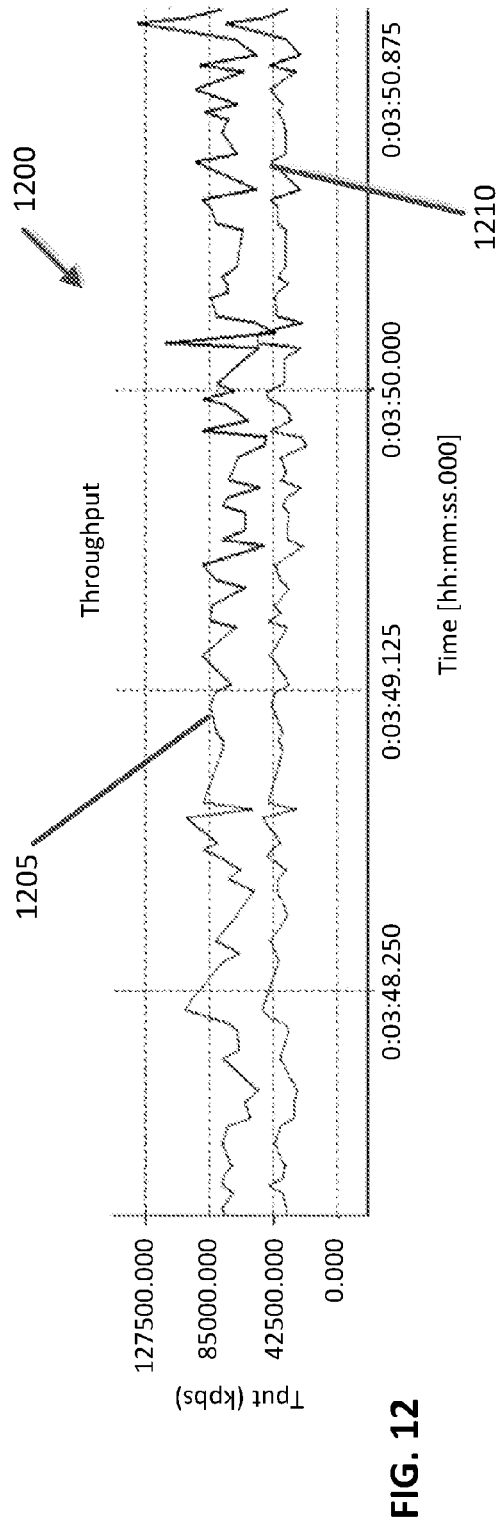
FIG. 12 is a chart depicting measured throughput of primary and secondary cells in accordance with an embodiment.
Figure 13:
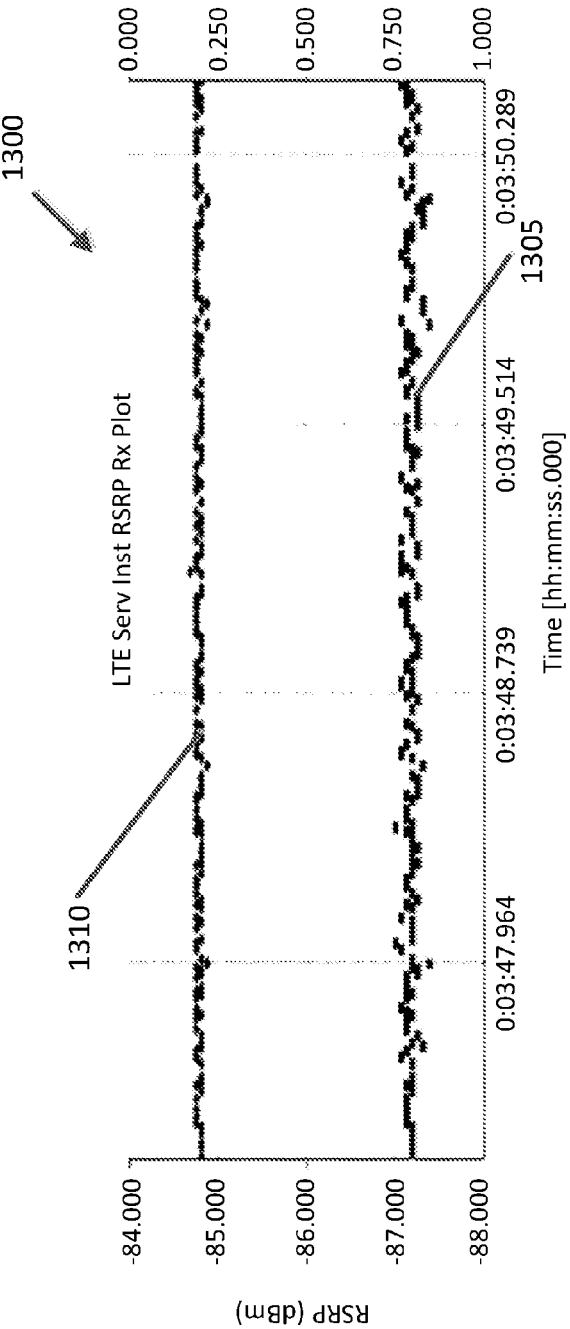
FIG. 13 is a chart depicting measured reference signal received power (RSRP) of primary and secondary cells in accordance with an embodiment.

FIG. 12 is a chart 1200 depicting measured throughput of primary and secondary cells in accordance with an embodiment. The chart 1200 shows experimental data as measured at a UE in just one example according to the embodiments disclosed herein. Many other throughput levels and PRSP/PRSQ levels may be measured by different UEs and according to various PCELLs and SCELLs based on a myriad of factors. FIGS. 12 and 13 merely demonstrate that throughput of an SCELL can be higher than a PCELL even where PRSP or PRSQ levels do not indicate that an SCELL is better than a PCELL. The chart 1200 shows a throughput level 1205 of an SCELL and a throughput level 1210 of a PCELL. As indicated on the chart 1200, average throughput of the throughput level 1205 of the SCELL is higher than an average throughput level of the throughput level 1210 of the PCELL.

FIG. 13 is a chart 1300 depicting measured reference signal received power (RSRP) of primary and secondary cells in accordance with an embodiment. The data of the chart 1300 was measured for the same UE communicating through the same PCELL and SCELL that showed higher throughput for the SCELL (associated with the throughput level 1205). The chart 1300 shows an RSRP level 1310 of the PCELL and an RSRP level 1305 of the SCELL. Accordingly, even though an RSRP level 1310 for the PCELL is higher than the RSRP level 1305 for the SCELL, the SCELL nonetheless has a higher throughput at the UE, as demonstrated by FIG. 12. Accordingly, following normal A5 reporting using RSRP/RSRQ levels, a UE may not be able to take advantage of the higher throughput of the SCELL. Instead, as disclosed herein, the UE may alter the RSRP/RSRQ levels reported in A5 reports in order to indicate to the network that the SCELL RSRP/RSRQ levels are better than the RSRP/RSRQ levels (even if in reality they are not). For example, A5 reports may be altered by adding values to the PCELL RSRP, substracting values from the SCELL RSRP, or both. As non-limiting examples, such values may be 5 decibels (db) or 10 db. The network can then initiate a handover procedure by sending a handover command to the UE so that the PCELL and the SCELL may be interchanged as disclosed herein throughout.

Advantageously, the systems and methods disclosed herein can achieve less packet loss and higher overall throughput for a UE because tune away is more efficient and there is a more effective use of downlink resources. In the tested scenario described above with respect to FIGS. 12 and 13, as just one possible example, the system had an average tune away time of 14.33 ms and, when applying the embodiments disclosed herein gained at least 30 mbps of throughput during tune away. Accordingly, the UE had 30 mbps better speed for approximately 14 ms per paging cycle, which is a significant advantage considering various transmission time intervals (TTI) that exist for various RATs (e.g., LTE has a 1 ms TTI).

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present method and apparatus.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present method and apparatus. Various modifications to these embodiments will be readily apparent to those skilled in the art, and the generic principles defined herein may be applied to some embodiments without departing from the spirit or scope of the method and apparatus. Thus, the present method and apparatus is not intended to be limited to the embodiments shown herein but is to be accorded the widest scope consistent with the following claims and the principles and novel features disclosed herein.

The invention claimed is:

1. A method of managing a wireless communication device having a first subscription and a second subscription, the method comprising:
   receiving communications corresponding to the first subscription via a primary cell and a secondary cell;
   determining, based on a schedule associated with the first subscription, a first data throughput rate of communications from the primary cell and a second data throughput rate of communications from the secondary cell;
   sending at least one event measurement report in response to a determination that the second data throughput rate is higher than the first data throughput rate;
   receiving a handover command from a network node to interchange primary cell functionality and secondary cell functionality; and
   exchanging, in response to receiving the handover command, the primary cell functionality with the secondary cell functionality for the first subscription.

2. The method of claim 1, wherein the at least one event measurement report comprises an altered event measurement report including an altered cell measurement value, wherein a cell measurement value of the secondary cell is offset from a cell measurement value of the primary cell by a threshold.

3. The method of claim 1, wherein:
   exchanging the primary cell functionality with the secondary cell functionality comprises tuning away from the first subscription to the second subscription during a tune away period; and
   receiving, via the secondary cell, communications corresponding to the second subscription during the tune away period.

4. The method of claim 3, wherein receiving the communications corresponding to the second subscription during the tune away period further comprises:
   suspending data downlink communications for the first subscription over the secondary cell;
   receiving data downlink communications for the second subscription via the secondary cell; and
   monitoring at least one page slot of the data downlink communications for the second subscription.

5. The method of claim 1, wherein the first data throughput rate is an average throughput rate of data transmitted via the primary cell.

6. The method of claim 5, wherein the first data throughput rate is calculated based on total bits received in a current paging cycle of the second subscription over the primary cell and a time duration in which the primary cell is monitored during the current paging cycle.

7. The method of claim 1, wherein the first data throughput rate comprises an average throughput rate of data transmitted over the primary cell and an additional hysteresis factor.

8. The method of claim 1, further comprising:
   determining that the second data throughput rate is higher than the first data throughput rate, including comparing the first data throughput rate and the second data throughput rate every paging cycle of the second subscription.

9. A wireless communication device comprising:
   at least one radio frequency (RF) resource configured to receive communications corresponding to a first subscription via a primary cell and a secondary cell; and
   a processor coupled to the at least one RF resource and coupled to a first Subscriber Identity Module (SIM) associated with a first subscription and to a second SIM associated with a second subscription, the processor configured to:
      determine, based on a schedule associated with the first subscription, a first data throughput rate of communications from the primary cell and a second data throughput rate of communications from the secondary cell;
      send at least one event measurement report in response to a determination that the second data throughput rate is higher than the first data throughput rate;
      receive a handover command from a network node to interchange primary cell functionality and secondary cell functionality; and
      exchange, in response to receiving the handover command, the primary cell functionality with the secondary cell functionality for the first subscription.

10. The wireless communication device of claim 9, wherein the first subscription is a carrier aggregated Long Term Evolution (LTE) subscription.

11. The wireless communication device of claim 9, wherein communications via the primary cell and the secondary cell are configured in a carrier aggregation scheme, wherein communications via the primary cell are associated with a first component carrier and communications via the secondary cell are associated with a second component carrier.

12. The wireless communication device of claim 9, wherein the processor is further configured, wherein
   the exchange of the primary cell functionality with the secondary cell functionality comprises tuning away from the first subscription to the second subscription during a tune away period; and
   receive, via the secondary cell, communications corresponding to the second subscription during the tune away period.

13. A method of managing a wireless communication device having a first subscription supporting more than one radio access technology (RAT) active simultaneously, the method comprising:
   receiving communications corresponding to a first RAT of the first subscription via a primary cell and a secondary cell;
   determining, based on a schedule associated with the first subscription, a first data throughput rate of communications from the primary cell and a second data throughput rate of communications from the secondary cell;
   sending at least one event measurement report in response to a determination that the second data throughput rate is higher than the first data throughput rate;
   receiving a handover command from a network node to interchange primary cell functionality and secondary cell functionality; and exchanging, in response to receiving the handover command, the primary cell functionality with the secondary cell functionality for the first RAT.

14. The method of claim 13, wherein:
    exchanging of the primary cell functionality with the secondary cell functionality comprises tuning away from the first subscription to a second subscription during a turn away period; and
    receiving, via the secondary cell, communications corresponding to a second RAT during the tune away period.

15. The method of claim 14, wherein the first RAT is a Long Term Evolution (LTE) technology and the second RAT is a Code Division Multiple Access (CDMA) 1× technology.

16. The method of claim 14, wherein receiving communications corresponding to the second RAT comprises monitoring at least one page slot associated with the second RAT.

* * * * *